Figure 1:
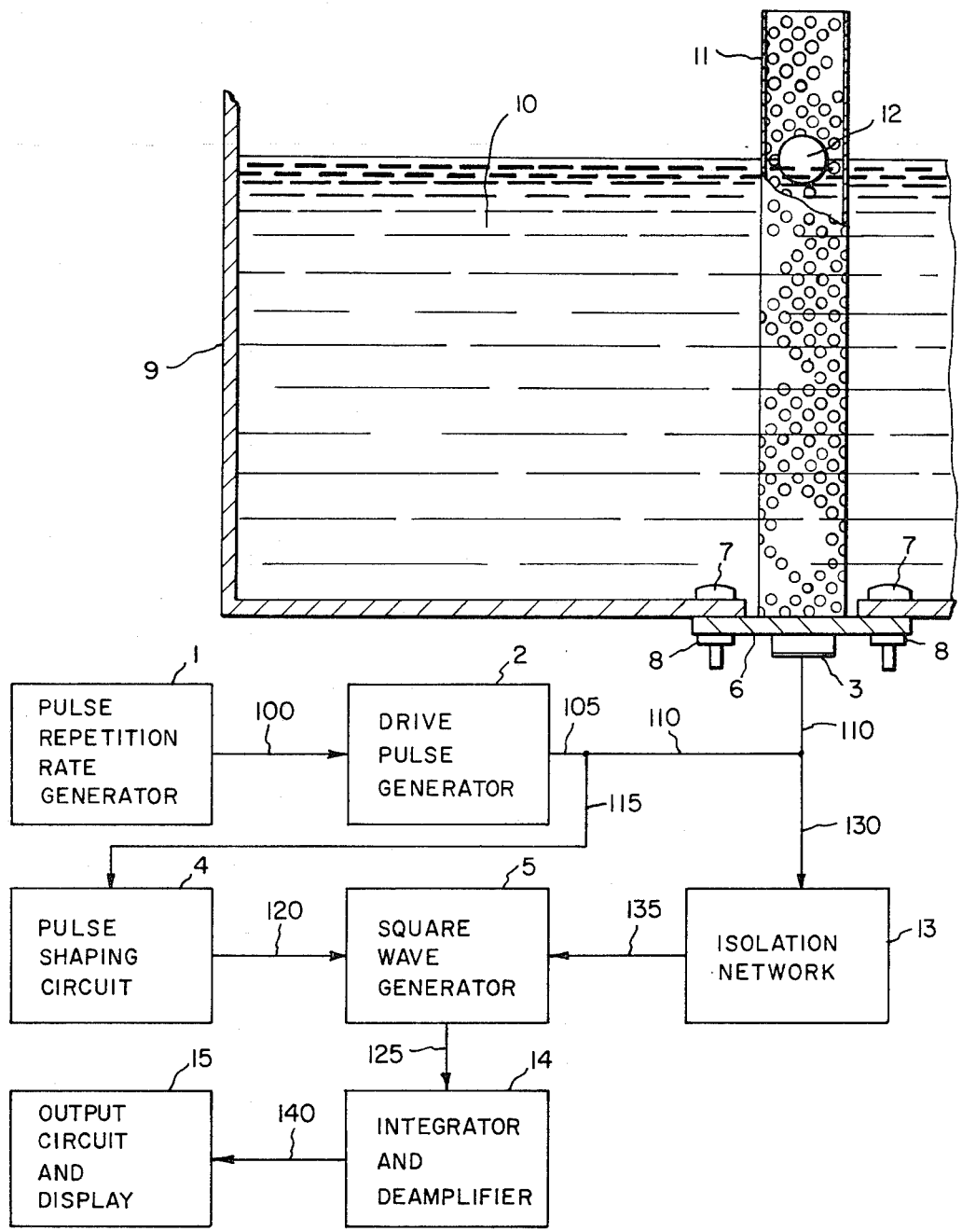

United States Patent

Johnson

[15] 3,693,445
[45] Sept. 26, 1972

[54] LIQUID LEVEL MEASUREMENT DEVICE

[72] Inventor: Sven J. Johnson, Main Road, Southhold, N.Y. 11917

[22] Filed: June 26, 1970

[21] Appl. No.: 50,192

[52] U.S. Cl....................................73/290 V, 73/313
[51] Int. Cl..........................G01f 23/12, G01f 23/28
[58] Field of Search............................73/290 V, 313

[56] References Cited

UNITED STATES PATENTS

| | | | |
|---|---|---|---|
| 3,372,592 | 3/1968 | Gravert | 73/313 |
| 3,208,281 | 9/1965 | Kalmus et al. | 73/313 |
| 2,853,878 | 9/1958 | Anderson et al. | 73/313 |
| 3,473,102 | 10/1969 | Williams | 73/313 X |
| 3,350,942 | 11/1967 | Peltola | 73/339 A |

FOREIGN PATENTS OR APPLICATIONS

| | | | |
|---|---|---|---|
| 1,126,419 | 7/1956 | France | 73/290 V |
| 873,801 | 7/1961 | Great Britain | 73/290 V |

*Primary Examiner*—Louis R. Prince
*Assistant Examiner*—Frederick Shoon
*Attorney*—Edward Halle

[57] ABSTRACT

A liquid level measurement device utilizes ultrasonics to determine the height of a liquid. The ultrasonic transducer is located at the bottom of the liquid container and within a porous or holey cylinder. Ultrasonic pulses are transmitted up the cylinder to a spherical float where they are reflected back to the transducer and sensed. The cylinder tends to minimize the spherical spread of the pulse wave. A timing system measures the time interval between the transmission and reception of the ultrasonic pulses by the transducer. The time interval measured is directly proportional to the height of the liquid and is electronically converted to an equivalent height.

4 Claims, 1 Drawing Figure

INVENTOR.
SVEN J. JOHNSON
BY Edward Halle
ATTORNEY.

LIQUID LEVEL MEASUREMENT DEVICE

The present liquid level measurement device provides a simple, economical and reliable means for measuring the height of the liquid in a tank. The device is analogous to sonar in that the round trip time for a signal pulse is used to deduce distance. The novelty here is in the use of an enclosed floating target to measure the height of the liquid above, the transducer with the enclosure also minimizing the spherical spread of the pulse waves.

Prior systems for measuring the height of liquid involved the measurement of electrical conductivity or capacitance between two concentric cylinders. The prior systems have been unreliable and not suited for sloshing or turbulent liquid. Furthermore, the presence of electronic equipment in an inflammable liquid can be hazardous.

The present device is accurate and adaptable to turbulent liquid. In addition, no electronic equipment is used in the liquid. The use of well known and available circuits provides a substantial economy in the design and manufacture of the system.

The liquid level measurement device comprises an ultrasonic transducer, a cylinder, a float and associated electronic circuitry. The ultrasonic transducer is used to transmit and receive ultrasonic pulses, and is mounted in the vicinity of the bottom of the liquid tank. It is the height of the liquid above the transducer which is measured.

The transducer is mounted on a plate which is attached to the tank bottom over a hole. The thickness of the plate is chosen to be in resonance with the operating ultrasonic carrier frequency. The transducer is external to the liquid.

The cylinder is attached to the bottom of the tank with the transducer at one end. The cylinder has holes or pores in it so that the liquid is free to flow through it. The float is inside the cylinder and floats on the surface of the liquid. A spherical float provides the same cross section for all orientations and is desirable.

The electronic circuitry is used to generate and detect high frequency pulses and to measure the round trip time for these pulses. A pulse is generated by the electronics and transmitted acoustically through the liquid by the transducer. A portion of the ultrasonic pulse is reflected back to the transducer by the float and is detected by the electronics. The cylinder maintains the float in a desirable region and minimizes the spherical spread of the ultrasonic pulse.

The transmission of the ultrasonic pulse initiates the generation of a step function while the reflected pulse terminates the step so as to form a square wave. Then, a square wave of predetermined height is generated for each transmitted pulse and the length of the square wave is equal to the time for the round trip of each ultrasonic pulse. Additional circuitry transforms the square wave into an equivalent liquid height and displays the value.

A preferred embodiment of the invention has been chosen for purposes of illustration and description, and is shown in the accompanying drawings, forming a part of the specification, wherein:

FIG. 1 is a block diagram of the electronics and a fragmentary elevational view of the implementation of the preferred embodiment of the invention.

The liquid level measurement device allows the level of liquid to be measured accurately and reliably with all the electronic equipment external to the liquid. The preferred embodiment of the invention is shown in FIG. 1.

The pulse repetition rate generator 1 generates periodic pulses generally in the order of kilohertz but the rate can be in the megahertz region for certain applications such as low liquid levels. The repetition rate of generator 1 is such that the interval between pulses is usually greater than the round trip time of the ultrasonic pulse which will be described.

The signal from generator 1 goes on line 100 to the drive pulse generator 2 where the signal is amplified. The output of generator 2 on line 105 is divided into a signal on line 115 which has no affect on the system operating a signal on line 110 which drives the ultrasonic transducer 3, and a signal on line 130 which goes to the isolation network 13. The signal in the isolation network 13 is attenuated, but the output on line 135 will cause the square wave generator 5 to have an output on line 125 of a step function. The square wave generator is a monostable multivibrator, which when triggered by the proper pulse shape on line 135 will change its state such that a step function appears at the output. A signal on line 120 cannot cause this change of state. The natural time delay for the square wave generator to return to its normal stable state is made to be greater than the maximum delay expected of an echo pulse from the transducer but shorter than the interval between pulses generated by the pulse repetition rate generator. If a pulse appears on line 120 after the square wave generator has been triggered into its unstable state, if will return to the original state and the step function at its output will be terminated, yielding a square wave with length equal to the delay time of the echo. The main function of the isolation network is to reduce the amplitude of the transmitted pulse as well as that of the echo pulse on line 120, eliminating any spurious signals which might be generated by the transducer and preventing any unwanted triggering of the square wave generator by portions of the echo pulse. The height of the output signal on line 125 is predetermined and maintained constant.

The transducer 3 is attached to plate 6. The thickness of plate 6 is selected with respect to the ultrasonic frequency used so that a resonance occurs and the transducer 3 is matched. Plate 6 is attached by means of bolts 7 and locking washers 8 to the bottom of the liquid tank 9. The composition of plate 6 is selected to be compatible with the liquid 10.

A cylinder 11 is attached to plate 6 so that transducer 3 lies in the vicinity of the axis. The cylinder 11 contains many holes or pores so that the liquid 10 can flow through the cylinder 11 and maintain the same liquid 10 level within cylinder 11 as within the rest of tank 9. Fast variations of the liquid 10 level such as sloshing tend to be minimized within the cylinder 11.

Float 12 is within cylinder 11 and floats on the surface of liquid 10. The cylinder 11 confines the lateral extent of float 12 so that float 12 is always essentially above transducer 3. The material used for the float 12 is selected to be compatible with the liquid 10. A hollow metal ball is a preferred choice for float 12. The use of a spherical shape for float 12 results in the same echo cross section for all orientations.

The signal pulse conducted on line 110 to transducer 3 causes transducer 3 to generate an ultrasonic pulse in liquid 10. The cylinder 11 tends to minimize the spherical spread of the ultrasonic pulse which ordinarily occurs. The spherical spread of an ultrasonic signal reduces the energy density of the propagating signal and has an effect similar to attenuation in that the signal to be intercepted is reduced.

The ultrasonic pulse travels up the cylinder 11 and is partially reflected by float 12. The echo from float 12 moves back down the cylinder 11 to plate 6 and is sensed by the transducer 3. Again, the cylinder 11 minimizes the spherical spread of the ultrasonic wave as it moves down the cylinder 11.

The echo received by the transducer 3 results in a signal on line 110 which goes on line 130 to the isolation network 13 and on line 115 to the pulse shaping circuit 4. The isolation network 13 attenuates the echo signal from line 130 so as to provide a negligible output signal level on line 135. The pulse shaping circuit 4 amplifies and shapes the echo pulse so that the signal which goes to the square wave generator 5 on line 120 is a pulse with a sharp front, and the pulse terminates the output signal on line 125 so as to form a square wave.

The square wave output from generator 5 has a length equal to the round trip time of an ultrasonic pulse. Each time pulse repetition rate generator 1 supplies a pulse, the above process is repeated and generator 5 has an output of a square wave with a length equal to the round trip time of an ultrasonic pulse. The repetition rate of generator 1 must be lower than the round trip time of an ultrasonic pulse.

The output of generator 5 goes on line 125 to the integrating and D.C. amplifier 14 where the square waves are integrated and amplified and then go on line 140 to the output circuit and display 15 where the signal is transformed into a display indicating the height or equivalence of the liquid 10 in tank 9.

In the preferred embodiment, the output signal to the display 15 was put into an analog form. If a digital form had been desired, the two inputs to generator 5 could have been used to start and stop a synchronous generator connected to a counter.

As various changes may be made in the form, construction and arrangement of the parts herein without departing from the spirit and scope of the invention, and without sacrificing any of its advantages, it is to be understood that all the matter herein is to be interpreted as illustrative and not in a limiting sense.

Wherefore I claim:

1. In an apparatus for measuring the height of liquid, the combination comprising a transmitter coupled to an ultrasonic transducer, a movable float, confining means surrounding the float throughout its range of motion to limit the lateral excursion of said float, and a receiver with timing means coupled to said transducer and said transmitter; wherein said ultrasonic transducer is positioned with relation to said confining means to direct ultrasonic pulses toward said float, and said receiver is positioned to receive echoes of said ultrasonic pulses from said float within said confining means; together with means for confining the ultrasonic pulses to the portion of the medium within said first mentioned confining means.

2. In an apparatus for measuring the height of liquid as claimed in claim 1, said confining means being a cylinder having fluid communication means.

3. In an apparatus for measuring the height of liquid as claimed in claim 2, said fluid communication means comprising a plurality of apertures positioned in at least one wall of said cylinder to provide for fluid communication through said cylinder wall.

4. In an apparatus for measuring the height of liquid as claimed in claim 1, said float being spherical in form.

* * * * *